(12) United States Patent
De Sisti et al.

(10) Patent No.: US 6,623,146 B2
(45) Date of Patent: Sep. 23, 2003

(54) LIFTING APPARATUS PARTICULARLY FOR LIGHTING FITTINGS

(75) Inventors: Mario De Sisti, Cecchina Albano Laziale Roma (IT); Fabio De Sisti, Cecchina Albano Laziale Roma (IT)

(73) Assignee: De Sisti Lighting S.p.A., Rome (IT)

( * ) Notice: Subject to any disclaimer, the term of this patent is extended or adjusted under 35 U.S.C. 154(b) by 0 days.

(21) Appl. No.: 09/909,270

(22) Filed: Jul. 19, 2001

(65) Prior Publication Data

US 2002/0075689 A1 Jun. 20, 2002

(30) Foreign Application Priority Data

Jul. 19, 2000 (IT) .................................. RM2000A000398

(51) Int. Cl.[7] .............................. F21V 21/36; B66F 3/22
(52) U.S. Cl. ..................... 362/403; 362/382; 254/122; 254/89 H; 254/93 R
(58) Field of Search ................................ 362/382, 386, 362/418, 428, 286, 403; 254/122, 133 R, 89 H, 93 R, 8 R, 8 B, 8 C, 10 R, 93 H

(56) References Cited

U.S. PATENT DOCUMENTS 5,029,814 A * 7/1991 Liegel et al. ................ 254/122

* cited by examiner

*Primary Examiner*—Sandra O'Shea
*Assistant Examiner*—Bao Truong
(74) *Attorney, Agent, or Firm*—Samuels, Gauthier & Stevens

(57) ABSTRACT

The invention relates to an improved lifting apparatus (1), particularly for lighting fittings and not, for shooting studios, comprising a pair of pantograph structures (2, 3), provided side by side, spaced and substantially parallel each other, provided above with coupling suspension means (7) and at the bottom with means (8) for coupling the fitting to be lifted, motorization means (10), to operate both said parallelogram structures, provided above, between said two parallelogram structures (2, 3), and coupling means to connect said motorization means with each one of said parallelogram structures, said apparatus (1) being characterized in that the upper and lower end arms (4) of each one of said pantograph structures are provided with teeth (12) meshing with corresponding teeth (12) provided on the corresponding arm of the same pantograph structure (2, 3).

3 Claims, 1 Drawing Sheet

LIFTING APPARATUS PARTICULARLY FOR LIGHTING FITTINGS

The present invention relates to an improvement in a lifting apparatus, particularly for lighting fittings and not, for shooting studios.

More particularly, the invention concerns an apparatus of the above kind that allows avoiding, or at least dramatically reducing, effects of possible stresses that could act on the apparatus and that could destabilising the same apparatus.

As it is known, in the cinema and/or television shooting field, and particularly the indoor shootings, many fittings are suspended from the ceiling by lifting apparatuses. Mainly, but not exclusively, they are lighting fittings.

Lifting apparatuses are generally provided with a manually or motor controlled horizontal movement and with a manually or motor controlled vertical movement.

One of the main problems that must be faced up when using this kind of apparatuses is due to the fact that during the motion of the lifting apparatus, supporting a very heavy fitting, the same lifting apparatus must be as more stable as possible.

In fact, every slight motion can, in view of the long arms, induce remarkable stresses on the same apparatus, with the obvious consequences.

Apparatuses presently employed are not able to completely satisfy this kind of needing.

In the most recent apparatuses, it is provided a double pantograph structure, wherein it is necessary to be able that, beside the needing of obtaining a determined stability, it is guaranteed that every displacement caused on an arm of a parallelogram corresponds to an analogous displacement on the arm of the other parallelogram.

To obtain this kind of result, following any kind of movement of the apparatus, i.e. both in extension and retraction of the apparatus, at present a solution is used providing, both above and at the bottom on the double parallelogram structure, a pair of horizontal slots, and a vertical slot, allowing to transfer every movement acts on an arm of a parallelogram, on the corresponding arm of the other parallelogram.

However, this kind of solution does not allow to completely solving the problems connected with the transmission of the motion and with the stabilisation of the structure.

In view of the above, the Applicant has realised a solution able to solve all the above mentioned problems.

Main object of the present invention is that of providing an apparatus allowing to realise an apparatus of the above kind having optimum stability features during its displacement.

It is therefore specific object of the present invention an improved lifting apparatus, particularly for lighting fittings and not, for shooting studios, comprising a pair of pantograph structures, provided side by side, spaced and substantially parallel each other, provided above with coupling suspension means and at the bottom with means for coupling the fitting to be lifted, motorization means, to operate both said parallelogram structures, provided above, between said two parallelogram structures and coupling means to connect said motorization means with each one of said parallelogram structures, said apparatus being characterised in that the upper and lower end arms of each one of said pantograph structures are provided with teeth meshing with corresponding teeth provided on the corresponding arm of the same pantograph structure.

Preferably, according to the invention, said end arms of each pantograph structure are rotatably pivoted on plate means.

Still according to the inventions said teeth of said end arms are section bars.

The present invention will be now described, for illustrative but not limitative purposes, according to its preferred embodiments, with particular reference to the figures of the enclosed drawings, wherein.

Figure 2:
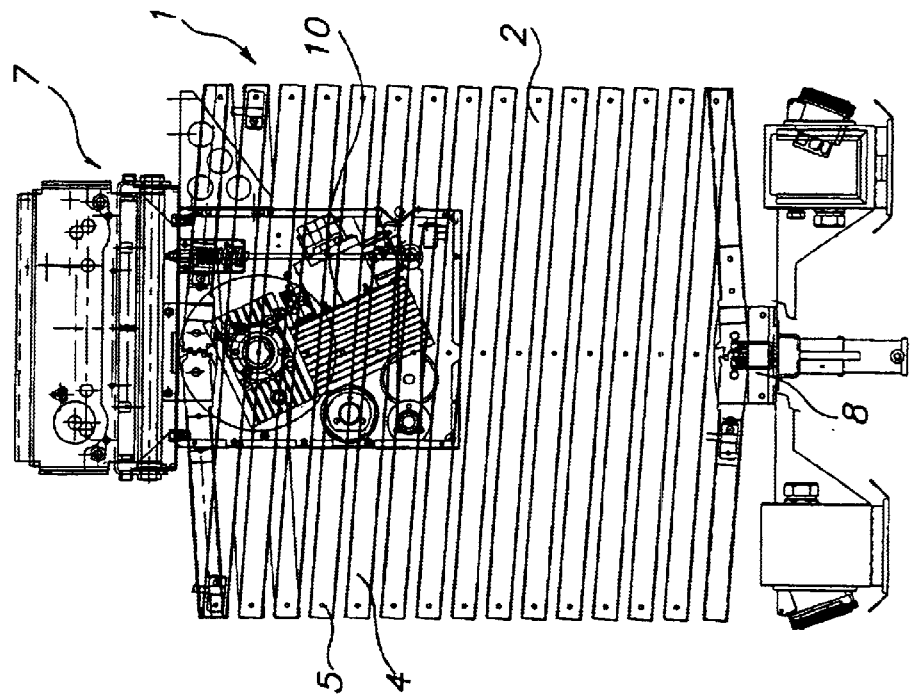
FIG. 2 is a front view of the apparatus of FIG. 1.
Figure 1:
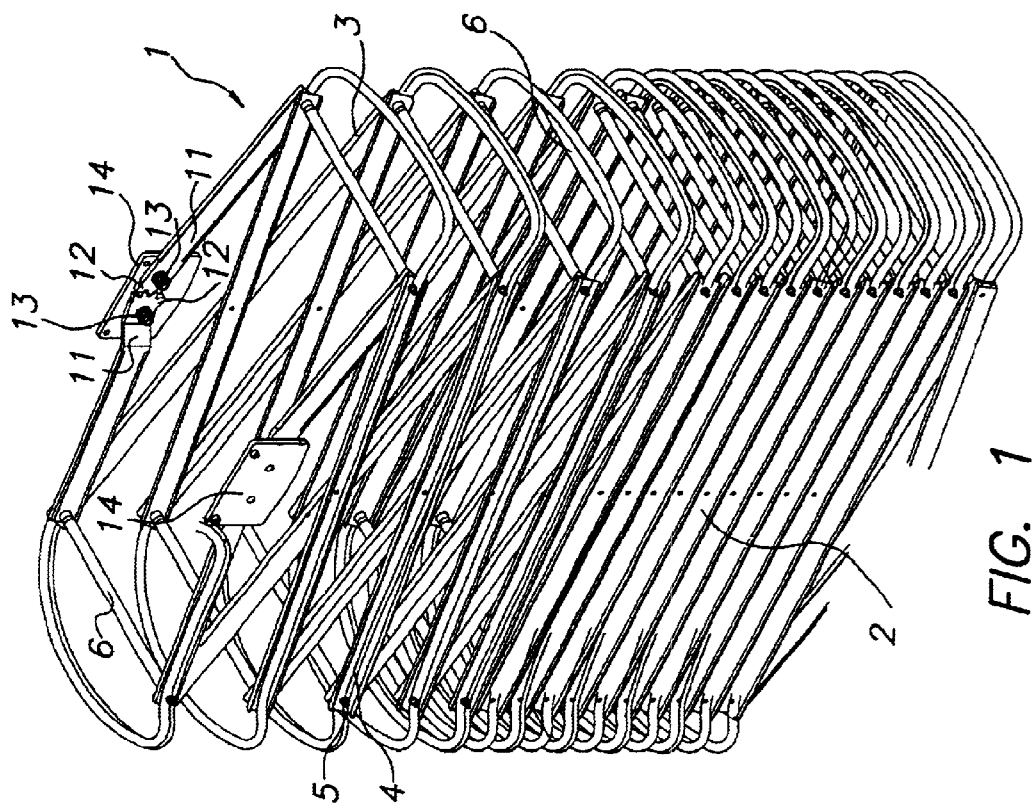
FIG. 1 is a perspective view of an apparatus according to the invention.

Referring to both the figures of the enclosed drawings, it is shown an apparatus 1 according to the invention comprising two pantograph structures 2 and 3, substantially parallel and space each other, each one comprising a plurality of arms 4 linked in the articulation points 5, and coupled each other by transverse bars 6.

Above said parallelogram structures 2 and 3 means 7 are provided (FIG. 2), not shown in greater detail since they are not part of the present invention.

Said apparatus 1 further provides at the bottom an coupling 8 for the fitting to be suspended (that is generically indicated by the reference number 9), and provided with a horizontal movement, by not shown means, that can be an automatic or manual movement, and with a vertical movement (also these solutions are not described in detail sine they are not part of the scope of the present invention).

As it can be noted from the figures, ratiomotor 10 is placed between the two pantograph structures, in such a way to have the lowest possible height dimensions, so that when the apparatus 1 according to the invention is closed, the fitting suspended to the same will be in the highest position, thus eliminating the risk that it is shot during the shootings.

The innovative solution suggested according to the present invention provides for each one of the pantographs 2 and 3, in correspondence of the ends 11 of the upper and lower arms 4 of each one of them, a toothing 12, meshing with the corresponding toothing provided on the arm 4 of the pantograph.

Said two ends 11 are pivoted in the point indicated by the reference number 13, on a plate 14.

Said mechanism, comprised of toothed ends and of a pivoting plate, is provided both above and at the bottom, on both the pantographs.

In this way, every movement induced in one of the two pantographs 2, 3 is automatically transmitted also to the other arm of the pantograph, without any problem of instability of the structure.

Teeth of the toothings 12 will obviously be designed according to the specific needing, both for their dimensions and their loading capability.

The present invention has been described for illustrative but not limitative purposes, according to its preferred embodiments, but it is to be understood that modifications and/or changes can be introduced by those skilled in the art without departing from the relevant scope as defined in the enclosed claims.

What is claimed is:

1. Improved lifting apparatus particularly for lighting fittings, said improved lighting apparatus comprising a pair of pantograph structures, provided side by side, space and substantially parallel each other, and having a bottom, a coupling suspension means provided above the bottom, and at the bottom with a means for coupling a fitting to be lifted, motorization means, to operate both said parallelogram structures, between said two parallelogram structures and coupling means to connect said motorization means with each one of said parallelogram structures, said apparatus being characterized in that upper and lower end arms of each one of said pantograph structures are provided with teeth meshing with corresponding teeth provided on the corresponding arm of the same pantograph structures.

2. Apparatus according to claim 1, characterised in that said end arms of each pantograph structure are rotatably pivoted on plate means.

3. Apparatus according to claim 1, characterised in that said teeth of said end arms are section bars.

* * * * *